United States Patent [19]
Leinhos

[11] Patent Number: 5,721,813
[45] Date of Patent: Feb. 24, 1998

[54] METHOD AND SYSTEM FOR ARRANGING TEXT FOR LABEL PRINTING

[75] Inventor: James A. Leinhos, Oakland, Mich.

[73] Assignee: Electronic Data Systems Corporation, Plano, Tex.

[21] Appl. No.: 597,063

[22] Filed: Feb. 5, 1996

[51] Int. Cl.[6] .................................................. G06K 15/00
[52] U.S. Cl. .................................... 395/117; 395/768
[58] Field of Search ................................. 395/117, 101, 395/108, 766, 767, 768, 769, 770, 771, 765, 784, 785; 400/61, 62, 67, 68, 76

[56] References Cited

U.S. PATENT DOCUMENTS 4,435,777  3/1984  McCaskill et al. .................... 364/900
4,875,174  10/1989  Olodort et al. ........................ 364/519
5,297,245  3/1994  Kitamura ............................... 315/149

*Primary Examiner*—Arthur G. Evans
*Attorney, Agent, or Firm*—L. Joy Griebenow

[57] ABSTRACT

Method and system for arranging text for label printing employs a label program (28) operable to receive a data selection and a user interface (32) operable to receive format parameters of a form. The data selection include at least one data block. The format parameters includes an array corresponding to a layout of the form. The label program (28) is further operable to receive the format parameters from the user interface (32), to format an application file to conform to the format parameters, including a table of cells corresponding to the array, to transfer each data block to a cell of the table, and to print the application file to the form (42).

19 Claims, 2 Drawing Sheets

1

METHOD AND SYSTEM FOR ARRANGING TEXT FOR LABEL PRINTING

TECHNICAL FIELD OF THE INVENTION

The present invention relates generally to arranging data in a computing device, and more particularly to an improved system for, and method of, arranging text for label printing.

BACKGROUND OF THE INVENTION

Labels are well-known as a means of identifying files, correspondence, and the like. Typically, labels are packaged in sheets comprising printing stock adhered to a waxed backing. A label sheet generally includes an array of labels arranged in columns and rows. Label sheets may be die cut or non-die cut. Die cut sheets normally leave marginal stock on the waxed backing when labels are removed. Non-die cut sheets, on the other hand, generally do not leave any stock on the waxed backing when labels are removed.

Label printing programs are often used in connection with computing devices to print labels. Most label printing programs have a user enter text directly into a dialog box or into a document corresponding to the layout of the label sheet. Direct entry of text, however, is not convenient when the text is already electronically available as, for example, either a salutation of a letter or a master address document. Copy and paste routines may be used to avoid text retyping. Copy and paste routines, however, are tedious, requiring the user to go from one document to another, one text block at a time.

Additionally, label printing programs generally print labels starting at the top of a label sheet. As labels are removed from the top of a die cut sheet and the sheet is reused, raised edges of the waste stock may cause a printer to jam. Non-die cut sheets, on the other hand, expose the flexible waxed backing. The waxed backing is generally flimsy and may cause a sheet to misfeed in a printer. Such a misfeed may also jam a printer. A laser printer jammed with an adhesive label is costly to repair. Moreover, an expensive label sheet is wasted.

SUMMARY OF THE INVENTION

In accordance with the present invention, a system and method of arranging text or other type of data for printing onto a label or other type of form is provided that substantially eliminates and reduces the disadvantages and problems associated with prior label printing programs.

In accordance with the present invention, a system for arranging text for label printing includes a form program coupled to an interface. The form program receives a data selection including at least one data block. The interface receives format parameters of a form. The format parameters include an array corresponding to a layout of the form. The form program receives the format parameters from the interface and formats an application file to conform to the format parameters. The formatted file includes a table of cells corresponding to the array. Each data block is transferred to a cell of the table in the file. The file is printed to the form.

More specifically, in accordance with one embodiment, a text selection may be received by duplicating text highlighted in an initial application file. An intermediate application file may be used to modify the textual data. In response to a request to change an attribute of the textual data, such as the font, an attribute interface is displayed on a monitor. In response to an attribute selection, the selected attribute of the text is modified. Additionally, the interface from which the format parameters are selected may be displayed on the monitor for selection. The interface may be a dialog box of a graphical user interface.

Important technical advantages of the present invention include an improved method and system for arranging text for label printing. In particular, the invention allows a user to print labels from electronically-available text or other types of data without having to retype the text or to use time-consuming copy and paste routines.

Another important technical advantage of the present invention includes providing a system that uses labels from a bottom portion of a label sheet. Accordingly, the present invention allows a label sheet to be reused without the raised edges of a die cut sheet or the waxed backing of a non-die cut sheet causing a printer to jam.

Other technical advantages are readily apparent to one skilled in the art from the following figures, descriptions, and claims.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, although not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, terms, numbers, records, files or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no involvement of a human operator is necessary or even desirable in the present invention. The operations described herein are machine operations performed in conjunction with a human operator or user that interacts with the computer.

In addition, it should be understood that the programs, processes, methods, etc. described herein are not related or limited to any particular computer or apparatus. Rather, various types of general purpose computing machines or devices may be used with programs constructed in accordance with the teachings described herein. Similarly, it may prove advantageous to construct specialized apparatus to perform the method steps described herein by way of dedicated computer systems with hardwired logic or programs stored in non-volatile memory, such as read only memory.

Figure 1:
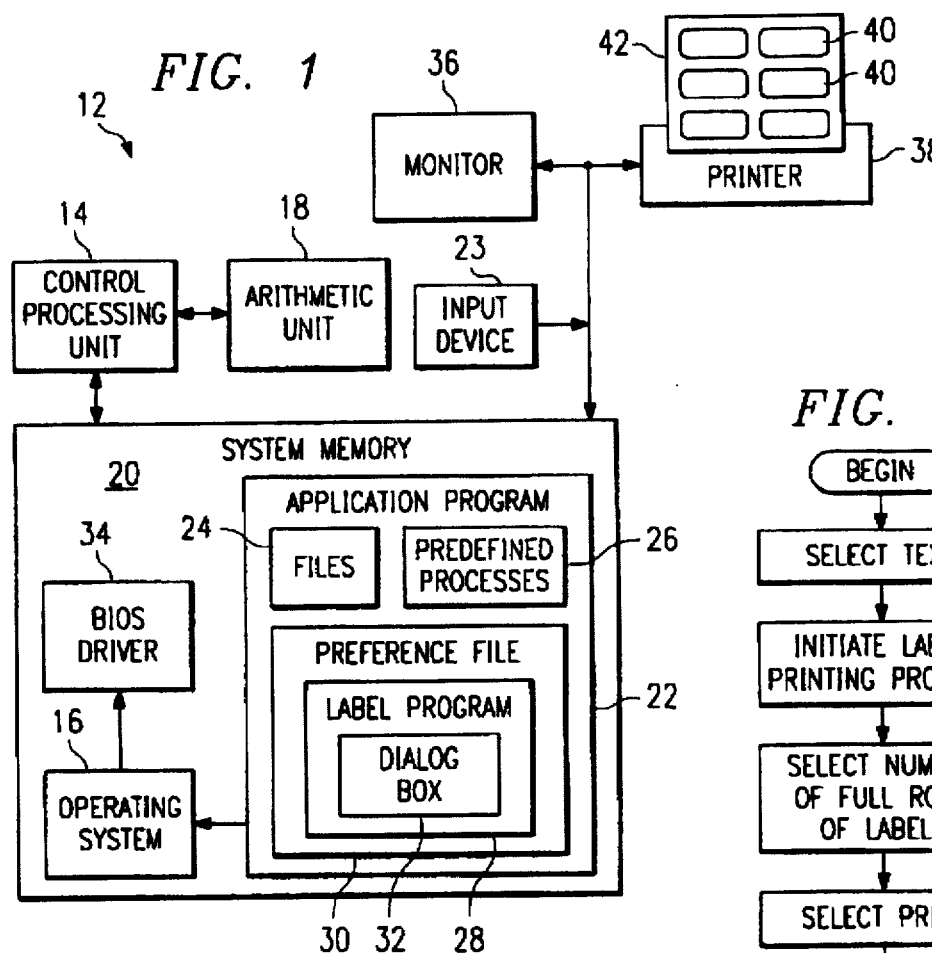
FIG. 1 is a schematic block diagram of a computer system for arranging text for label printing in accordance with the present invention.

Referring now in more detail to the drawings, in which like numerals refer to like parts throughout the several views, FIG. 1 is a schematic block diagram of the components of a preferred operating environment, a computer system 12. The computer system 12 comprises a central processing unit (CPU) 14 that operates the computer system in conjunction with an operating system 16 to retrieve, process, store, and display data.

The CPU 14 is typically implemented as a microprocessor, such as that manufactured by Apple Computer or by Intel Corporation. The CPU 14 communicates control, address, and data signals with the operating system 16 and with the remaining components of the computer system 12 through a system bus. An arithmetic unit 18 may be provided to assist the CPU 14 in preforming mathematical calculations.

The operating system 16 comprises a set of computer programs that control the internal functions of the computer system 12, thereby allowing the computer system to run application software. The operating system 16 is typically installed in the mass storage device, such as a hard disk drive, a floppy disk drive, a CD disk drive, or a ROM chip. During boot-up (initialization) of the computer system 12, the operating system 16 is loaded into system memory 20.

A computer-implemented application program 22 is also loaded into the system memory 20 from a hard disk drive, a floppy disk drive, or a CD disk drive. The application 22 may be a word processing program or another program capable of manipulating text. Preferably the application 22 includes routines for editing text, such as copy and paste routines, and for formatting documents, such as font changes, page layout, and the like.

The application program 22 may include one or more associated files 24 that are opened and closed by the application program. The application program 22 may also include predefined processes 26 such as copy and paste routines and formatting facilities. A label program 28 for arranging text for label printing in accordance with the present invention may be stored in a preference file 30 of the application program 22. The label program 28 may be stored as a macro, a routine, or the like. Preferably the label program 28 is operable to access the predefined processes 26.

The application program 22 operates in conjunction with the operating system 16 to request and receive information from a user. Such communications may be carried out through a graphical user interface and an input device 33. The label program 28 may include a dialog box 32, which is described below in detail, for communicating with a user in a graphical user interface. The input device 33 may be a keyboard, a mouse, a track pad, or the like.

A basic input/output system (BIOS) driver 34 is stored in system memory 20 along with the operating system 16 and the application program 22. The BIOS driver 34 supplies the device-level control and support services for primary input/output devices of the computer 12 during the boot process. After a boot, the BIOS driver 34 accepts requests from the application program 22 and from the operating system 16 running on the computer system 12 and performs input/output services as requested by those programs. The functions and operations of conventional BIOS drivers are well known and will not be further described.

The application program 22 is called by the operating system 16 upon request by a user. Data is passed from the application program 22 to the CPU 14 and BIOS driver 34 by operating system 16. Data may be displayed electronically by a monitor 36 or a hard copy may be generated by printer 38 as a result of data sent from the operating system 16 to the BIOS driver 34.

According to a specific embodiment of the present invention, the computer system 12 may be an "INTEL" platform manufactured by Compaq Computer. The application 22 may be implemented as a word processing program, such as "MICROSOFT WORD" manufactured by Microsoft Incorporated. In this embodiment, blocks of textual data each representing an address may be displayed by the monitor 36 and printed by the printer 38. The printer 38 may be the type which employs laser or an ink jet process or the like. The text blocks may be printed onto labels 40 of a label sheet 42.

Figure 2:
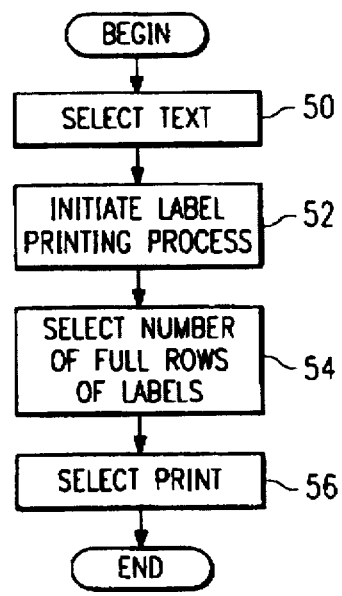
FIG. 2 is a flow chart from a user's perspective of the process of printing labels using the computer system of FIG. 1.

FIG. 2 shows the process by which a user may utilize the computer system 12 embodying the present invention to print labels 40. The process begins at step 50 in which the user selects text that is to be printed onto one or more labels 40. Text is generally selected by highlighting text of an open application file with a cursor. The selected text may include one or more individual blocks of text. For example, the selected text may comprise the salutation of a letter having a single text block or may comprise a master address document having numerous individual text blocks.

Proceeding to step 52, the user initiates the label printing process for the selected text. The label printing process may be initiated by invoking, or running, the label program 28. As previously described, the label program 28 may be a macro, a routine, or the like. The label program 28 may be invoked by activating an associated tool bar button or other icon, by selecting the label program from a drop down menu, or the like.

Figure 3:
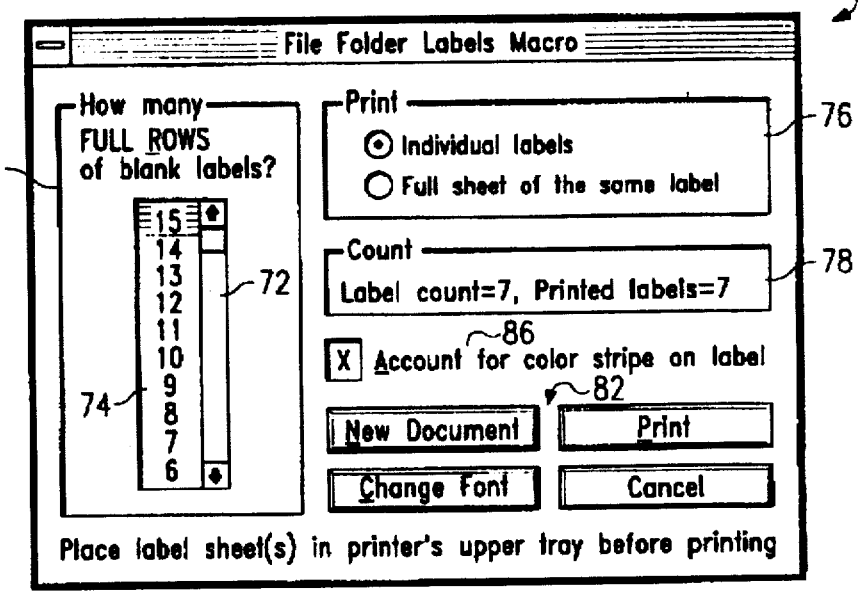
FIG. 3 illustrates a dialog box for label printing in accordance with the present invention.

In response, as described below in detail, the label program 28 of the present invention may display the dialog box 32. As shown by FIG. 3, the dialog box 32 comprises a plurality of fields in which various formatting parameters for label printing may be selected by the user. A row field 70 includes a scroll bar 72 and a vertical listing 74 of the number of full rows of labels 40 remaining on the label sheet 42 to be printed. The user determines the number of full rows remaining on the label sheet 42 and selects the corresponding number in the vertical listing 74 of the row field 70.

The dialog box 32 may also include other fields that allow the user to select various options. For example, the dialog box 32 may contain a print option field 76. When the selected text includes only a single text block, the print option field 76 allows the user to print either an individual label containing that text block or a full sheet of labels containing that same text block. A full sheet of labels containing the same text block may be desired when the text represents an address that is commonly used. For example, a patent attorney might print a full sheet of labels containing the mailing address of the Patent and Trademark Office. Thus, rather than printing a Patent Office label each time one is needed, the attorney could print a full sheet of Patent Office labels and use those labels over an extended period.

The dialog box 32 may also include a count field 78 showing the number of individual text blocks contained in the selected text. The count field 78 may also show the total number of label sheets that will be necessary to use to print the selected text. Additionally, the dialog box 32 may include a design field 80 that allows the user to account for a specific label design, such as a colored stripe along the top of a label.

The dialog box 32 may also include a command field 82 having various commands to which the label program 28 is responsive. For example, as shown in FIG. 3, the command field may include print, change font, new document, and cancel commands. These commands are explained below in detail.

Proceeding to step 54, with the dialog box 32 displayed, the user selects the number of full rows remaining on the label sheet 42. The user may also select desired options, such as a font change. After the user is satisfied with the selected format parameters, the user selects print, or another command at step 56.

The process of the present invention, as described below in detail, then arranges the selected text and prints labels of that text. Preferably, if less than a full sheet of labels will be printed, the process arranges the selected text such that labels 40 from a bottom portion of the sheet 42 are used.

Thus, the present invention allows a user to print labels 40 from electronically available text without having to retype the text or to use time-consuming copy and paste routines. Additionally, labels 40 are used from a bottom portion of the label sheet 42. Thus, a partially used label sheet 42 will have labels 40 remaining at the top of the sheet, the bottom labels having been used. Accordingly, a label sheet 42 may be reused without the raised edges at the top of a die cut sheet or the waxed backing at the top of a non-die cut sheet causing the printer 38 to jam.

Figure 4:
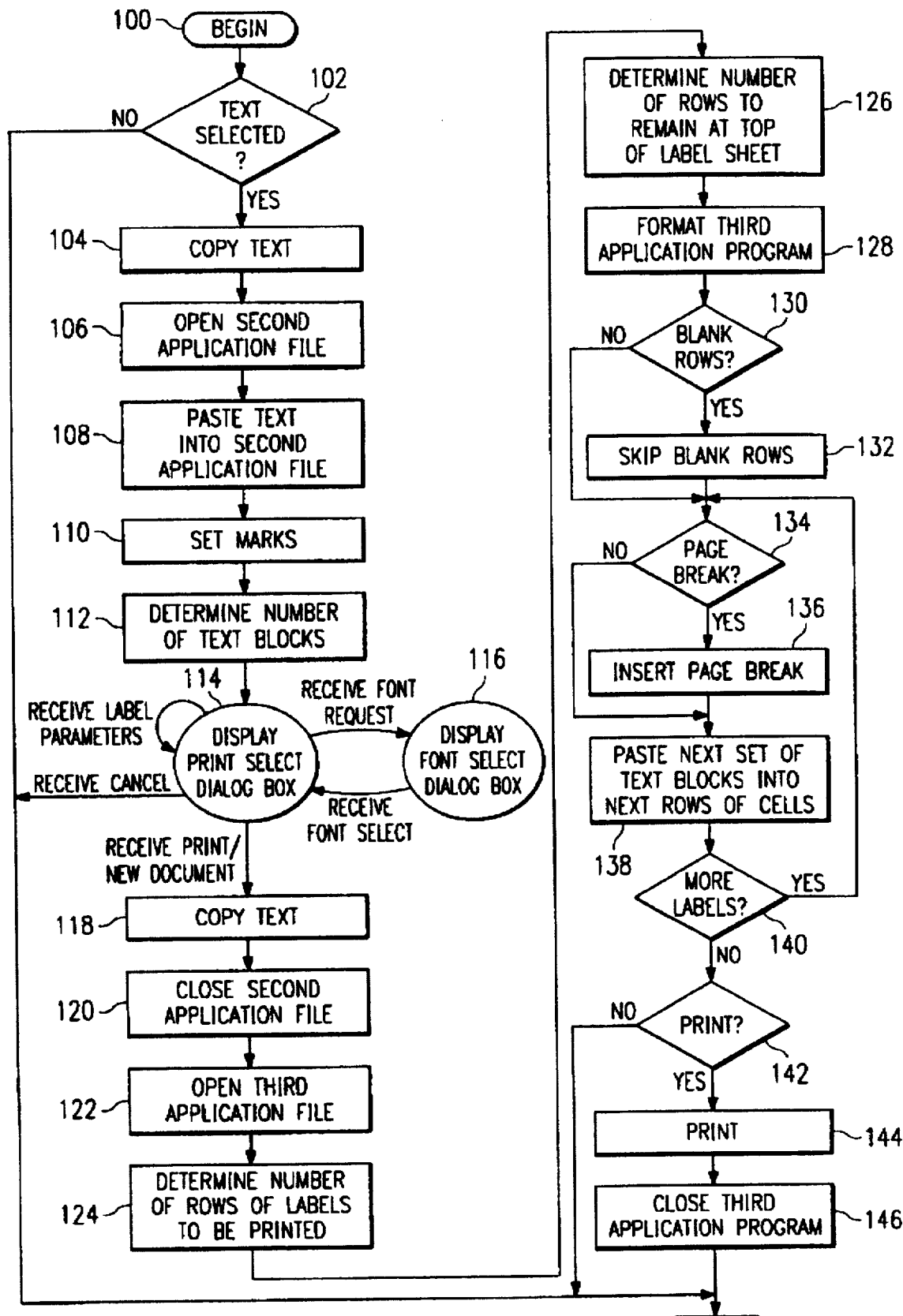
FIG. 4 is a flow chart of a method of printing labels in accordance with the present invention.

FIG. 4 shows the method of the present invention for arranging text for label printing. As previously discussed, the method of the present invention comprises a series of machine operations and not manual operations of a human operator. Although the method of the present invention is described in terms of arranging text for label printing, those skilled in the art will understand that the present invention encompasses arranging other types of data for printing to other types of forms. As used herein, the term "form" means a label or other type of prestructured printing stock. The term data means one or more items of information.

The method begins at step 100 with an initiation event. The initiation event may be the invoking of the label program 28 by the user. As previously described, the label program 28 may be stored as a macro, a routine, or the like and may be initiated by activating an associated tool bar button or other icon, by selecting the label program from a drop down menu, or the like.

Proceeding to decisional step 102, the label program 28 determines whether any text is selected for printing. If no text is selected, the NO branch of decisional step 102 leads to the end of the label program and no labels are printed. If text is selected for label printing, the YES branch of decisional step 102 leads to step 104.

At step 104, the label program 28 makes an electronic duplicate of the selected text and holds the duplicate in system memory 20. The selected text may be duplicated by using a copy routine of the predefined processes 26 of the application program 22. Next, at step 106, a second application file is opened. The second application file may be opened by using a new document routine of the predefined processes 26. The second application file will be used by the label program 28 to prepare the selected text for label printing.

Proceeding to step 108, the duplicated text is transferred to the second application file. The selected text may be transferred using a paste routine of the predefined processes 26. Next, at step 110, reference marks are set in the second application file at the beginning and the end of the text. The reference marks may be bookmarks provided by the predefined processes 26.

Next, at step 112, the label program 28 determines the number of individual text blocks contained in the text. The number of text blocks may be determined by searching the text, starting at the first bookmark and proceeding to the second bookmark, for instances of contiguous double returns. The text may be searched using a search routine of the predefined processes 26. Text separated by contiguous double returns, which translates into being spaced apart by a single line, will be treated as separate text blocks. It will be understood that other criteria may be used in accordance with the present invention to determine the number of text blocks.

Step 112 leads to state 114. At state 114, the label program 28 displays a user interface. The user interface may be the dialog box 32. As previously described, the user may select format parameters from the dialog box 32. The label program 28 receives the format parameters selected from the dialog box 32. The format parameters include an array corresponding to a layout of the label sheet 42. After the user is satisfied with the selected format parameters, the user may select the print, change font, new document, or cancel commands from the dialog box 32. The label program 28 remains in state 114 until a command is received.

At state 114, upon receipt of a cancel command, the canceled branch of state 114 leads to the end of the process and no labels are printed. Upon receipt of a change font command, the change font branch of state 114 leads to state 116. At state 116, a font select dialog box of the predefined processes 26 is displayed. From the font select dialog box, the user may change the font, font size, style, or other attributes of the text. Upon receipt of a font selection, the font select branch of state 116 returns to state 114. Upon receipt of a print or new document command, the print/new document branch of state 114 leads to step 118.

At step 118, the label program 28 makes an electronic duplicate of the text in the second application file, including the bookmarks and any font changes, and holds the duplicate in system memory 20. The text may be duplicated by using the copy routine of the predefined processes 26. Next, at step 120, the second application file is closed. Thus, the second application file is used as an intermediate file in which the text may be manipulated, such as by a font change. At step 122, a third application file is opened.

Proceeding to step 124, the number of rows of labels to be printed is determined. The number of rows of labels to be printed may be determined by dividing the number of text blocks, which was determined at step 112, by the total number of labels per row on the label sheet 42. The total number of labels per row may be hard coded for a particular type of label sheet or may be received with the other format parameters at state 114. Alternatively, the total number of labels per row for a variety of label sheets may be hard coded into the label program 28 and the type of label sheet received at state 114. The number of rows of labels to be printed, for example, would equal five where the number of text blocks equals twenty and there are four labels per row on the label sheet 42. If the number of text blocks is not a multiple of the number of labels per row, the number of printed rows may be determined by the integer value of the sum of one plus the number of text blocks divided by the number of labels per row. The total number of labels per row on the label sheet 42 may vary depending on the type of label sheet being used.

Proceeding to step 126, the number, if any, of blank rows of labels to remain at the top of the label sheet 42 is determined. The number of blank rows to remain at the top of the label sheet 42 is determined by subtracting the number of full rows on the sheet 42, which is received at state 114, from the number of rows of labels to be printed, which is determined at step 124. If the number of rows of labels to be printed equals or exceeds the number of full rows remaining on sheet 42, the entire sheet 42 will be used and the number of blank rows is zero. Conversely, if the number of full rows remaining on sheet 42 exceeds the number of rows of labels to be printed, only a portion of the label sheet 42 will be used. By leaving the blank rows at the top of the label sheet 42, labels will be used from the bottom portion of the sheet 42. Thus, a partially used label sheet 42 will have labels 40 remaining at the top of the sheet, the bottom labels having been used. Accordingly, the label sheet 42 may be reused without raised edges at the top of a die cut sheet or waxed backing at the top of a non-die cut sheet causing the printer 38 to jam.

Next, at step 128, the label program 28 formats the third application file to conform to the format parameters. The third application file may be formatted by creating a table or similar structure of cells corresponding to the array of the format parameters, which corresponds to the layout of the label sheet 42. Formatting may also include setting the paper size to match that of the label, setting the proper margins, and the like. The array of the label sheet 42, margins, and other formatting information may be hard coded for a particular type of label or may be received with the other format parameters at state 114. Alternatively, the formatting information for a variety of label sheets may be hard coded into the label program 28 and the type of label sheet 42 received at state 114.

In the following steps 130–140, the label program 28 fills the table formatted in the third application file. As described below in detail, cells are bypassed, or skipped, and text is inserted into the table starting at the top left cell and moving from left to right, top to bottom, one row at a time. At decisional step 130, the label program 28 determines whether any rows at the top of the table should be bypassed, and thus not have text inserted. Rows at the top of the table are skipped when blank rows are to remain at the top of the label sheet 42. As previously described in connection with step 126, blank rows will remain when only a portion of the labels 40 of the sheet 42 will be used. By bypassing the top rows, the text will be printed onto labels from the bottom portion of the sheet 42.

The number of rows, if any, to be bypassed at the top of the table is based on the determination at step 126 of the number of blank rows of labels to remain at the top of the label sheet 42. Accordingly, if the number of full rows on label sheet 42 is greater than the number of rows of labels to be printed, only a portion of the label sheet 42 will be used. In such a case, rows will be bypassed at the top of the table and the YES branch of decisional step 130 leads to step 132. At step 132, a number of rows at the top of the table are bypassed matching the number of blank rows of labels to remain at the top of the label sheet 42. Rows may be bypassed in the table by using a tab routine of the predefined processes 26. Each tab moves the text insertion point one cell to the right until the end of a row is reached, in which case a tab moves the insertion point to the first cell of the next row. Step 132 leads to decisional step 134.

Returning to step 130, if the number of rows of labels to be printed equals or exceeds the number of full rows on label sheet 42, the entire label sheet will be printed. Accordingly, no rows will be bypassed at the top of the table and the NO branch of decisional step 130 leads to step 134.

The following steps 134–140, form a loop in which the text blocks are transferred, or inserted, into the table. To track the position of the insertion point, the label program 28 may include a label counter, a column counter, and a row counter. The label counter is incremented each time a text block is inserted into a cell of the table and the insertion point tabbed to the next cell. The column counter is incremented each time the insertion point is tabbed into another column, and reset when the row counter is incremented. The row counter is incremented each time the insertion point is tabbed into another row.

At decisional step 134, it is determined whether a page break should be inserted in the table. A page break should be inserted at an appropriate place to account for previously used labels, if any, of the label sheet 42. The appropriate place for a page break is where the row counter is equal to the number of full rows of labels on the label sheet 42, which was received at state 114, plus one. For example, if label sheet 42 has four full rows of labels, a page break should be inserted between the fourth row and the fifth row. This may be accomplished by calling a page break routine of the predefined processes 26 when the insertion point is in the first cell of the fifth row.

If a page break is desired, the YES branch of decisional step 134 leads to step 136. At step 136, the page break is inserted. Step 136 leads to step 138. Returning to step 134, if a page break is not desired, the NO branch of decisional step 134 also leads to step 138.

At step 138, the text duplicated at step 118 and held in system memory 20, is transferred into the first available cell of the table. The first available cell is the first cell of the first row that was not skipped at step 132. The text may be transferred by using the paste routine of the predefined processes file 26. The label program 28 then searches for the first instance of a contiguous double return, which signifies the end of the first text block, and replaces the double return with the first bookmark. The text between the bookmarks is then removed from the cell, leaving only the first text block. The text may be removed from the cell by using a cut routine of the predefined processes 26.

Next, the label program 28 tabs into the next cell of the row and repeats the process, leaving only the second text block in the second cell. This process is repeated for each cell in the current row. After a row has been filled, the process proceeds to decisional step 140.

At decisional step 140, it is determined whether more text blocks remain to be inserted into the table. More text blocks remain if the label counter is less than the total number of text blocks that was determined at step 112. If more text blocks remain, the YES branch of decisional step 140 returns to decisional step 134 wherein a page break determination is made.

When all the text blocks have been inserted into the table and no text blocks remain, the NO branch of decisional step 140 leads to decisional step 142. At decisional step 142 it is determined whether a print command or a new document command was received from state 114. If the print command was received at state 114, the table containing the text blocks is printed on the label sheet 42 at step 144. Next, at step 146 the third application file is closed. Step 146 leads to the end of the process.

If, however, the new document command was received at state 114, the NO branch of decisional step 142 leads to the end of the process. Accordingly, no labels are printed. Instead, the user is allowed to view the table of the third application file. Thus, the user can determine whether the text blocks will properly fit onto the labels 40 prior to actually printing the labels.

Those skilled in the art will understand that the various steps of the present invention include error branches that cause the method to abort if an error condition such as the lack of free memory or the like exists in the computer system 12. Such error branches are well known in the art and are not directly related to the present invention. Accordingly, they will not be further described.

From the foregoing description of the present invention, other alternative constructions may suggest themselves to those skilled in the art. Therefore, the scope of the present invention is to be limited only by the claims below and the equivalence thereof.

What is claimed is:

1. A method of arranging data for printing, comprising the steps of:
   receiving a data selection, the data selection including at least one data block;
   transferring the data selection to an intermediate application file;
   inserting a first reference mark at the beginning of the transferred data and a second reference mark at the end of the transferred data;
   duplicating the referenced data;
   receiving format parameters of a form, the format parameters including an array corresponding to a layout of the form;
   formatting an application file to conform to the format parameters, the formatted file including a table of cells corresponding to the array;
   transferring each data block to a cell of the table; and
   printing the application file to the form.

2. The method of claim 1, wherein the step of receiving the data selection comprises the step of duplicating data highlighted in an initial application file.

3. The method of claim 1, further comprising the step of displaying on a monitor an interface from which one or more format parameters may be selected.

4. The method of claim 3, wherein the interface is a dialog box of a graphical user interface.

5. The method of claim 1, further comprising the steps of:
   in response to an attribute request, displaying on a monitor an attribute interface from which one or more attributes of the data may be selected;
   in response to an attribute select, modifying the selected attribute of the data; and
   duplicating the modified data.

6. The method of claim 1, further comprising the steps of:
   determining the number of data blocks contained in the data selection; and
   wherein the step of transferring each data block to a cell of the table comprises:
   transferring a data block to a cell;
   determining if a next data block exists;
      if a next data block exists, returning to the step of transferring a data block to a cell, the next data block becoming the data block and a next cell becoming the cell; and
      if a next data block does not exist, proceeding to the next step.

7. The method of claim 6, wherein the step of determining the number of data blocks contained in the data selection comprises:
   searching the data selection for instances of contiguous double returns, each contiguous double return denoting the end of a data block; and
   counting the instances of contiguous double returns.

8. The method of claim 6,
   wherein the step of transferring each data block to a cell comprises:
   transferring the referenced data to the cell;
   searching for the first instance of a contiguous double return;
   replacing the first contiguous double return with the first reference mark; and
   removing the data between the first and second reference marks from the cell.

9. The method of claim 1, wherein the data is textual data.

10. The method of claim 1, wherein the form is a label sheet.

11. A method of arranging data for label printing, comprising the steps of:
   receiving a data selection, the data selection including at least one data block;
   receiving format parameters of a label sheet, the format parameters including a total number of rows of the label sheet and an array corresponding to a layout of the label sheet;
   receiving a number of unused rows of the label sheet;
   formatting an application file to conform to the format parameters, the formatted file including a table of cells corresponding to the array;
   determining a number of rows of the label sheet to be printed;
   determining a number of rows to remain unused at a top of the label sheet;
   bypassing a number of rows at a top of the table corresponding to the number rows to remain unused at the top of the label sheet;
   transferring each data block to a remaining cell of the table; and
   printing the application file to the label sheet.

12. The method of claim 11, wherein the step of receiving the data selection comprises the step of duplicating data highlighted in an initial application file.

13. The method of claim 11, further comprising the steps of:
   determining the number of data blocks contained in the data selection; and wherein the step of transferring each data block to a cell of the table comprises:
- transferring a data block to a cell;
- determining if a next data block exists;
  - if a next data block exists, returning to the step of transferring a data block to a cell, the next data block becoming the data block and a next cell becoming the cell; and
  - if a next data block does not exist, proceeding to the next step.

14. The method of claim 13, wherein the step of determining the number of data blocks contained in the data selection comprises:
- searching the data selection for instances of contiguous double returns, each contiguous double return denoting the end of a data block; and
- counting the instances of contiguous double returns.

15. The method of claim 13, further comprising the steps of:
- opening an intermediate application file;
- transferring the data selection to the intermediate application file;
- inserting a first reference mark at the beginning of the transferred data and a second reference mark at the end of the transferred data;
- duplicating the referenced data; and
- wherein the step of transferring a data block to a cell comprises:
  - transferring the referenced data to the cell;
  - searching for the first instance of a contiguous double return;
  - replacing the first contiguous double return with the first reference mark; and
  - removing the data between the first and second reference marks from the cell.

16. The method of claim 13, further comprising the steps of:
- in response to a row of the table being filled, determining if a page break is needed;
- if a page break is needed, inserting a page break; and
- if a page break is not needed, proceeding to the next step.

17. The method of claim 11, wherein the data is textual data.

18. A system for arranging data for printing, comprising:
- a form program operable to receive a data selection including at least one data block, to transfer the data selection to an intermediate application file, to insert a first reference mark at the beginning of the transferred data and a second reference mark at the end of the transferred data, and to duplicate the referenced data;
- an interface coupled to the form program, the interface operable to receive format parameters of a form, the format parameters including an array corresponding to a layout of the form; and
- the form program further operable to receive the format parameters from the interface, to format a file of an application program to conform to the format parameters, the formatted file including a table of cells corresponding to the array, to transfer each data block to a cell of the table, and to print the application file to the form.

19. The system of claim 18, further comprising the application program having predefined processes including a cut, copy and paste routine.

* * * * *